(12) United States Patent
Carluccio

(10) Patent No.: US 12,170,701 B2
(45) Date of Patent: Dec. 17, 2024

(54) ISOLATING VIDEOCONFERENCE STREAMS

(71) Applicant: Zoom Video Communications, Inc., San Jose, CA (US)

(72) Inventor: Andrew Carluccio, San Francisco, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 18/102,428

(22) Filed: Jan. 27, 2023

(65) Prior Publication Data

US 2024/0259451 A1    Aug. 1, 2024

(51) Int. Cl.
*H04L 65/613* (2022.01)
*H04L 65/403* (2022.01)
*H04L 65/80* (2022.01)
*H04N 7/01* (2006.01)

(52) U.S. Cl.
CPC .......... *H04L 65/613* (2022.05); *H04L 65/403* (2013.01); *H04L 65/80* (2013.01); *H04N 7/0102* (2013.01); *H04N 7/0117* (2013.01)

(58) Field of Classification Search
CPC ..... H04L 65/613; H04L 65/403; H04L 65/80; H04N 7/0102; H04N 7/0117
See application file for complete search history.

(56) References Cited

U.S. PATENT DOCUMENTS

| | | | | |
|---|---|---|---|---|
| 10,999,344 | B1* | 5/2021 | Babkin | H04L 65/403 |
| 11,310,464 | B1* | 4/2022 | Swierk | G06N 3/084 |
| 11,350,058 | B1* | 5/2022 | Swierk | G06T 1/20 |
| 2009/0086013 | A1* | 4/2009 | Thapa | H04N 7/15 348/E7.083 |
| 2009/0115838 | A1* | 5/2009 | Kenoyer | H04N 7/15 348/E7.083 |
| 2010/0149301 | A1 | 6/2010 | Lee et al. | |

(Continued)

FOREIGN PATENT DOCUMENTS

| DE | 102013110614 B4 * | 8/2017 | H04L 65/403 |
|---|---|---|---|
| WO | WO-2022112775 A2 * | 6/2022 | H04N 19/33 |

OTHER PUBLICATIONS

U.S. Appl. No. 18/053, 185, "Non-Final Office Action", Sep. 28, 2023, 11 pages.

(Continued)

*Primary Examiner* — Oanh Duong
(74) *Attorney, Agent, or Firm* — Kilpatrick Townsend & Stockton LLP

(57) ABSTRACT

In some implementations, techniques may include requesting a set of input video streams from a videoconferencing service. The input video streams can be received at a computing device and the streams can correspond to one or more videoconference participants. In addition, the techniques may include receiving settings for one or more output video streams of a set of output video streams. These settings can indicate one or more output video stream properties. The techniques may include producing the set of output video streams from the set of input video streams according to the one or more output video stream properties. Moreover, the techniques may include outputting one or more output video streams of the set of output video streams.

20 Claims, 9 Drawing Sheets

(56) References Cited

U.S. PATENT DOCUMENTS

| | | | |
|---|---|---|---|
| 2013/0238709 A1* | 9/2013 | Martin | G06Q 50/01 |
| | | | 709/204 |
| 2015/0143401 A1* | 5/2015 | Xiong | H04N 21/4623 |
| | | | 725/25 |
| 2015/0156238 A1* | 6/2015 | Cooper | H04L 67/568 |
| | | | 709/219 |
| 2016/0148043 A1* | 5/2016 | Bathiche | G06T 5/001 |
| | | | 382/118 |
| 2021/0203519 A1* | 7/2021 | Sharma | H04N 21/2665 |

OTHER PUBLICATIONS

U.S. Appl. No. 18/053,185, "Final Office Action", Feb. 1, 2024, 12 pages.

* cited by examiner

FIG. 6

ISOLATING VIDEOCONFERENCE STREAMS

CROSS-REFERENCES TO RELATED APPLICATIONS

This application is related to U.S. patent application Ser. No. 18/053,185, filed Nov. 7, 2022, entitled "Videoconference Audiovisual Controller" which is hereby incorporated by reference in its entirety for all purposes.

FIELD

This disclosure generally relates to video conferencing, and more specifically relates to techniques for isolating videoconference streams.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 4-7 show example graphical user interfaces ("GUIs") for implementing techniques for isolating videoconference streams according to various embodiments;

DETAILED DESCRIPTION

Figure 1:
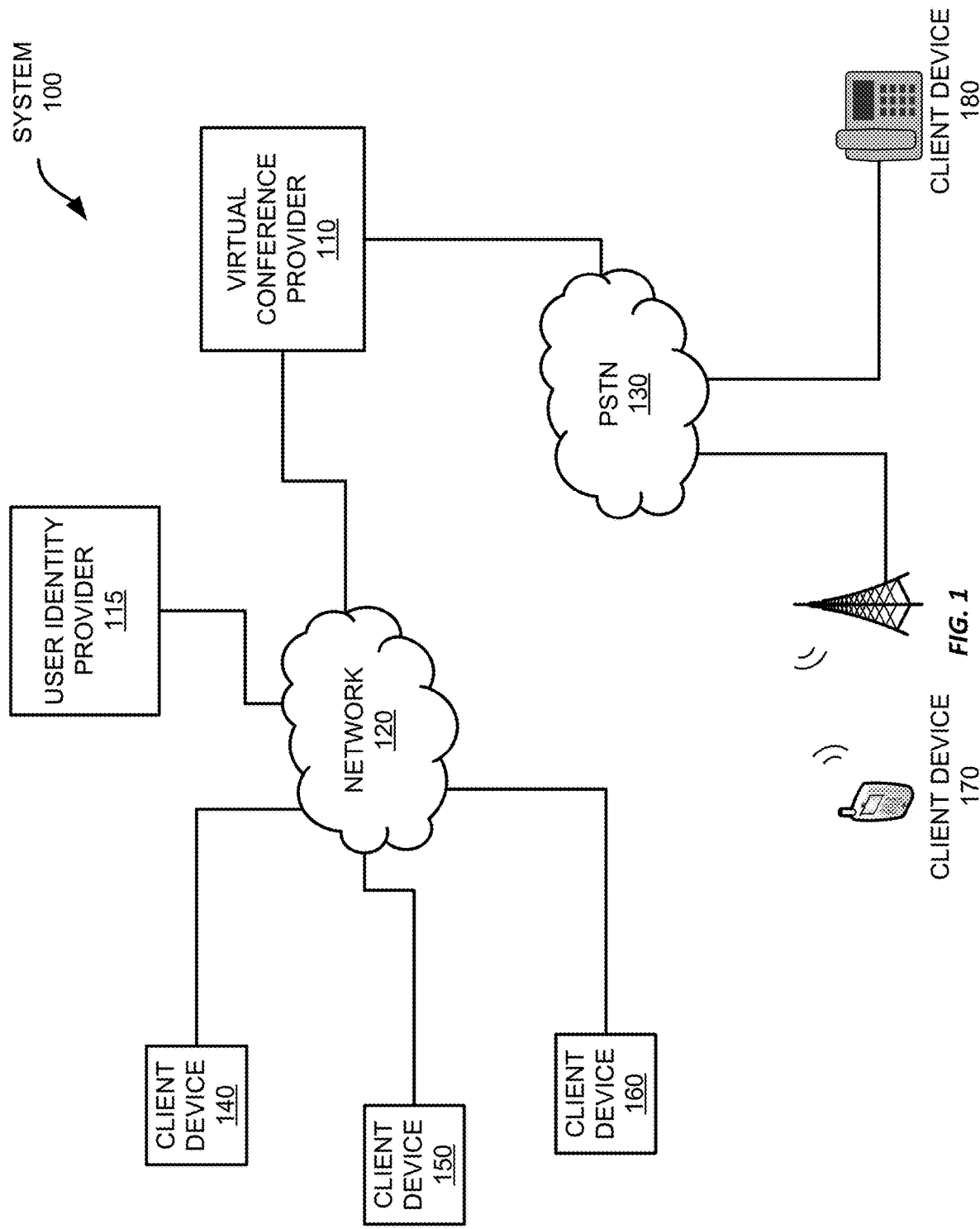
FIGS. 1-3 show example systems for implementing techniques for isolating videoconference streams according to various embodiments.

Examples are described herein in the context of isolating videoconference streams. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference (or "videoconference"), participants may engage with each other to discuss any matters of interest. Typically, such participants will interact in a virtual conference using a camera and microphone, which provides video and audio streams (each a "media" stream) that can be delivered to the other participants by the virtual conference provider and be displayed via the various client devices' displays or speakers.

While media streams are shared between the participant's client devices, accessing individual video streams from the videoconference media streams can be challenging. In some cases, only a small number of video streams may be provided at a time, or those video streams may be provided in different resolutions or bitrates. In addition, the video streams are not readily accessible to conference participants because the streams are displayed as part of a graphical user interface (or "GUI").

Currently, customers can only access isolated video streams through imperfect and inconvenient workarounds. As an example, a broadcaster can capture an isolated video stream as a screen capture recording from a computer where each stream is captured from a dedicated computer. These captured video streams may need to be edited, to remove the graphical user interface, scaled to the desired resolution, and converted to an appropriate format before editing or broadcasting. Such systems can be difficult to maintain because each isolated video stream may need to be captured and controlled from separate computers. For instance, each isolated video stream may need to be recorded as a separate screen recording from an individual computer, such as by running multiple instances of the client software, and the streams may be output in the screen recording software's native format. Professionally edited video streams may be prepared with video editing software, or video editing hardware, that may rely on software that can only work with certain output formats and such software and hardware may not work with the screen recording software's native format. As a result, screen recordings of individual video streams may not be appropriate for creating professionally edited video streams, such as during a live broadcast.

Instead, multiple isolated video streams can be captured from a videoconference data stream (e.g., input video stream) at a single computing device (or "client device"). A controller can be installed in a video production studio and be connected to a virtual conference provider via a network connection or production system (or "output devices"). Such a configuration allows the controller to operate on incoming video streams and provide the desired output video for editing and production activities. In the case of video streams received from a virtual conference, the isolated video streams can be received at the controller in a data stream from a video conference provider, and application programming interface (API) calls to the computer's processor and graphics processing unit ("GPU") can be used to sample the data feeds to produce video streams in any desired resolution, frame rate, or encoding format. The parameters for the isolated video streams captured from the data feeds, including frame rate, video resolution, and export format, can be specified as settings through a user interface and provided to the virtual conference service or the client device. The isolated video streams can be captured from the input video streams and then scaled to the specified video resolution and sampling the scaled data feed at the specified frame rate, or by generating frames between sampled frames to increase the available frame rate. These output video streams can be exported from the computer to production systems (e.g., video/sound editing software or video/sound editing hardware) in appropriate output formats including NDI, Syphon, BlackMagic Desktop Video (SDI), DisplayLink, etc. The output video streams can then be edited or output like a conventional camera feed using standard production systems (e.g., software or hardware).

This illustrative example is given to introduce the reader to the general subject matter discussed herein and the disclosure is not limited to this example. The following sections describe various additional non-limiting examples and examples of controlling virtual conference settings.

Referring now to FIG. 1, FIG. 1 shows an example system 100 that provides virtual conferencing functionality to various client devices. The system 100 includes a virtual conference provider 110 that is connected to multiple communication networks 120, 130, through which various client devices 140-180 can participate in virtual conferences hosted by the virtual conference provider 110. For example, the virtual conference provider 110 can be located within a private network to provide virtual conferencing services to devices within the private network, or it can be connected to a public network, e.g., the internet, so it may be accessed by anyone. Some examples may even provide a hybrid model in which a virtual conference provider 110 may supply components to enable a private organization to host private internal virtual conferences or to connect its system to the virtual conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity. In some instances, video conference provider 110 may provide a user profile language to virtual conference provider 210.

Figure 2:
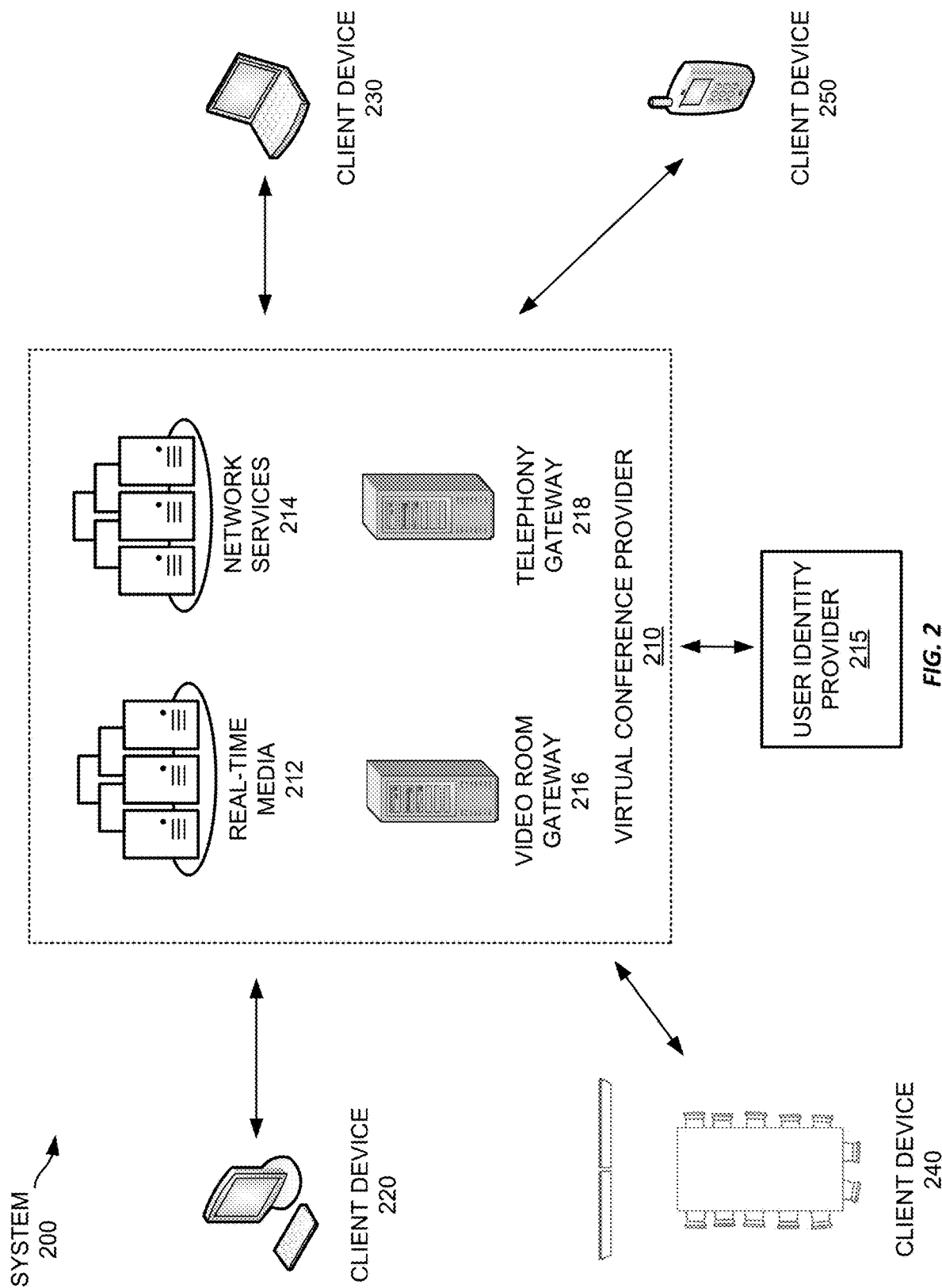

Virtual conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the virtual conference provider 110.

Meetings in this example virtual conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the virtual conference provider 110, a user may contact the video conference provider 110 using a client device 140-180 and select an option to create a new meeting. Such an option may be provided in a webpage accessed by a client device 140-160 or client application (or "client software") executed by a client device 140-160. Client software can include one or more host clients or participant clients. For telephony devices, the user may be presented with an audio menu that they may navigate by pressing numeric buttons on their telephony device. To create the meeting, the virtual conference provider 110 may prompt the user for certain information, such as a date, time, and duration for the meeting, a number of participants, a type of encryption to use, whether the meeting is confidential or open to the public, a meeting language, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The virtual conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the virtual conference provider 110. They also receive audio or video information from the virtual conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The virtual conference provider 110 may also invalidate the meeting information, such as the meeting identifier or password/passcode.

To provide such functionality, one or more client devices 140-180 may communicate with the virtual conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the virtual conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the virtual conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the virtual conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the virtual conference provider 110 using network 120 and may provide information to the virtual conference provider 110 to access functionality provided by the virtual conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the virtual conference provider 110.

A user identity provider 115 may be any entity trusted by the virtual conference provider 110 that can help identify a user to the virtual conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the virtual conference provider 110.

When the user accesses the virtual conference provider 110 using a client device, the virtual conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the virtual conference provider 110 either provides or denies access to its services, respectively. The user identify provider 115 may provide a user profile language to the virtual conference provider 110.

For telephony devices, e.g., client devices 170-180, the user may place a telephone call to the virtual conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the virtual conference provider 110. For example, telephony devices may be unable to provide user identification information to identify the telephony device or the user to the virtual conference provider 110. Thus, the virtual conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the virtual conference provider 110, even in cases where the user has an authenticated identity and employs a client device capable of identifying the user to the virtual conference provider 110. The virtual conference provider 110 may determine whether to allow such anonymous users to use services provided by the virtual conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the virtual conference provider 110 or it may be provided in an end-to-end configuration where media streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the virtual conference provider 110, while allowing the virtual conference provider 110 to access the decrypted media streams to perform certain processing, such as recording the meeting for the participants or generating transcripts of the meeting for the participants. End-to-end encryption may be used to keep the meeting entirely private to the participants without any worry about a virtual conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt media content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt media streams. Thus, while encrypting the media streams may be desirable in many instances, it is not required as it may prevent some users from participating in a meeting.

By using the example system shown in FIG. 1, users can create and participate in meetings using their respective client devices 140-180 via the virtual conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a virtual conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the virtual conference provider 210 over a communications network, such as the internet for client devices 220-240 or the PSTN for client device 250, generally as described above with respect to FIG. 1. The virtual conference provider 210 is also in communication with one or more user identity providers 215, which can authenticate various users to the virtual conference provider 210 generally as described above with respect to FIG. 1.

In this example, the virtual conference provider 210 employs multiple different servers (or groups of servers) to provide different aspects of video conference functionality, thereby enabling the various client devices to create and participate in video conference meetings. The virtual conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed media streams to meeting participants, such as the client devices 220-250 shown in FIG. 2. While video and audio streams typically originate at the respective client devices, they are transmitted from the client devices 220-250 to the virtual conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing. In some instances, the media stream may contain metadata indicating a language for the media stream or the client devices 220-250. The language may be a device language provided by software on the client device or a language selected by a user of the client device via a graphical user interface (GUI).

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives media streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing media streams, the real-time media servers 212 may also decrypt incoming media stream in some examples. As discussed above, media streams may be encrypted between the client devices 220-250 and the virtual conference provider 210. In some such examples, the real-time media servers 212 may decrypt incoming media streams, multiplex the media streams appropriately for the various clients, and encrypt the multiplexed streams for transmission.

In some examples, to provide multiplexed streams, the virtual conference provider 210 may receive media streams from the various participants and publish those streams to the various participants to subscribe to and receive. Thus, the virtual conference provider 210 notifies a client device, e.g., client device 220, about various media streams available from the other client devices 230-250, and the client device 220 can select which media stream(s) to subscribe to and receive. In some examples, the virtual conference provider 210 may provide to each client device the available streams from the other client devices, but from the respective client device itself, though in other examples it may provide all available streams to all available client devices. Using such a multiplexing technique, the virtual conference provider 210 may enable multiple different streams of varying quality, thereby allowing client devices to change streams in real-time as needed, e.g., based on network bandwidth, latency, etc.

As mentioned above with respect to FIG. 1, the virtual conference provider 210 may provide certain functionality with respect to unencrypted media streams at a user's request. For example, the meeting host may be able to request that the meeting be recorded or that a transcript of the audio streams be prepared, which may then be performed by the real-time media servers 212 using the decrypted media streams, or the recording or transcription functionality may be off-loaded to a dedicated server (or servers), e.g., cloud recording servers, for recording the audio and video streams. In some examples, the virtual conference provider 210 may allow a meeting participant to notify it of inappropriate behavior or content in a meeting. Such a notification may trigger the real-time media servers to 212 record a portion of the meeting for review by the virtual conference provider 210. Still other functionality may be implemented to take actions based on the decrypted media streams at the virtual conference provider, such as monitoring video or audio quality, adjusting or changing media encoding mechanisms, etc.

It should be appreciated that multiple real-time media servers 212 may be involved in communicating data for a single meeting and media streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the virtual conference provider 210 via local servers 212 to send and receive media streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing media streams may be distributed throughout the virtual conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the virtual conference provider under a supervisory set of servers. When a client device 220-250 accesses the virtual conference provider 210, it will typically communicate with one or more network services servers 214 to access their account or to participate in a meeting.

When a client device 220-250 first contacts the virtual conference provider 210 in this example, it is routed to a network services server 214. The client device may then provide access credentials for a user, e.g., a username and password or single sign-on credentials, to gain authenticated access to the virtual conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the virtual conference provider 210, or scheduling a new meeting, by interacting with the network services servers 214.

In some examples, users may access the virtual conference provider 210 anonymously. When communicating anonymously, a client device 220-250 may communicate with one or more network services servers 214 but only provide information to create or join a meeting, depending on what features the virtual conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, a meeting language, a source language or a target language for translation, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving media streams. In some instances, the real-time media servers 212 may store a source language, target language, user profile language, meeting language, or identified language for the media streams sent and received by the server.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle media streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive media streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the virtual conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the virtual conference provider 210. For example, the video conferencing hardware may be provided by the video conference provider to one or more of its subscribers, which may provide access credentials to the video conferencing hardware to use to connect to the virtual conference provider 210.

The video room gateway servers 216 provide specialized authentication and communication with the dedicated video conferencing hardware that may not be available to other client devices 220-230, 250. For example, the video conferencing hardware may register with the virtual conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the virtual conference provider 210.

Referring now to the telephony gateway servers 218, these servers 218 enable and facilitate telephony devices' participation in meetings hosed by the virtual conference provider 210. Because telephony devices communicate using the PSTN and not using computer networking protocols, such as TCP/IP, the telephony gateway servers 218 act as an interface that converts between the PSTN and the networking system used by the virtual conference provider 210.

For example, if a user uses a telephony device to connect to a meeting, they may dial a phone number corresponding to one of the virtual conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the virtual conference provider 210 discussed above are merely examples of such devices and an example architecture. Some virtual conference providers may provide more or less functionality than described above and may not separate functionality into different types of servers as discussed above. Instead, any suitable servers and network architectures may be used according to different examples.

Figure 3:
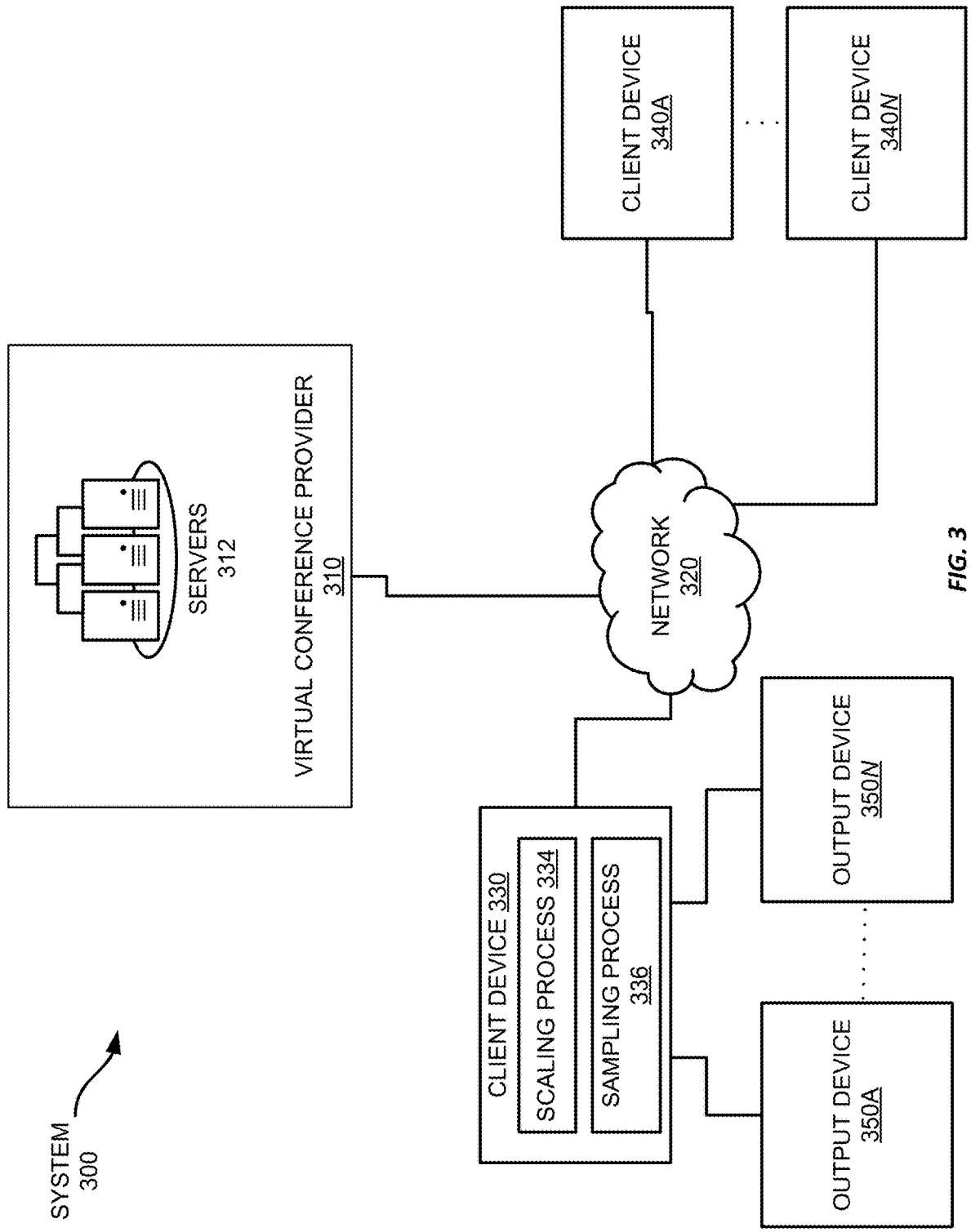

Referring now to FIG. 3, FIG. 3 shows an example system 300 for implementing a videoconference audiovisual controller. The system 300 includes a virtual conference provider 310, which can be connected to multiple client device 330, 340a-n via one or more intervening communication networks 320. In this example, the communications network 320 is the internet, however, any suitable communications network or combination of communications network may be employed, including LANs (e.g., within a corporate private LAN), WANs, etc.

Each client device 330, 340a-n executes virtual conference software, which connects to the virtual conference provider 310 and joins a meeting. During the meeting, the various participants (using virtual conference software or "client software" at their respective client devices 330, 340a-n) are able to interact with each other to conduct the meeting, such as by viewing video feeds and hearing audio feeds from other participants, and by capturing and transmitting video and audio of themselves (e.g., media streams).

Client devices 330, 340a-n may join virtual conferences hosted by the virtual conference provider 310 by connecting to the virtual conferences provider and joining a desired virtual conference, generally as discussed above with respect to FIGS. 1-2. Once the participants have joined the conference, they may interact with each other in real time by exchanging audio and video feeds (e.g., media streams). However, participants may wish to capture individual video streams (or "isolated video streams") to edit the video stream and integrate the stream into another format, such as a television broadcast of an interview conducted through the video conference provider.

One or more of the client devices 330, 340a-n can provide scaling functionality and sampling functionality for video feeds generated by the client devices 330, 340a-n or received from the client devices 330, 340a-n via the virtual conference provider 310. Scaling functionality is provided by one or more scaling processes 334 running on a client device 330. Similarly, sampling functionality is provided by one or more sampling processes 336 that can run on a client device 330. The scaling process 334 and the sampling process 336 can be executed by the client device 330 in response to a request received at the controller or from a client device such as client devices 340a-n. A request for a scaled or sampled video stream (or "output video stream") can be accompanied by settings corresponding to various parameters for the output video stream. Further, multiple requests for scaling or sampling may result in multiple instances of the scaling or sampling processes 334, 336 being executed.

The scaling functionality can be used to scale a received video stream (or "input video stream") based on settings that can include parameters for the output video stream including a specified resolution, aspect ratio, color balance, contrast, or brightness. The scaling functionality can request specific video feeds from the virtual conference provider. In some embodiments, the virtual conference provider may be able to provide multiple video feeds at different resolutions (e.g., a high-quality video feed, a low-quality video feed etc.). The multiple video feeds can allow the virtual conference provider to accommodate conference participants with low- or high-quality network connections. The scaling functionality can request the highest quality feed from the virtual conference provider.

Scaling functionality can include modifying the received input video stream in accordance with an output format specified in the settings, and the output format can be a data stream or file format that is compatible with display drivers including NDI, Syphon, BlackMagic Desktop Video (SDI), DisplayLink, etc. The input video stream can be received via a virtual conference provider 310 from a client device such as client devices 330, 340a-n and the settings can be specified by a user controlling one of the client devices (e.g., specified via a graphical user interface or command line interface). The sampling functionality can be used to sample the scaled input video stream at a framerate specified in the settings to produce the output video stream or to generate interpolated video frames if the specified output frame rate exceeds the frame rate of the received input video feed.

The client device 330 can allocate one scaling process 336 for each input video stream that is identified in the request for output video streams. This may involve executing multiple instances of a single scaling process or providing multiple video feeds to a single scaling process, or a combination of these techniques. In addition, a sampling process 336 may be assigned as well for each allocated scaling process 334. The scaled input video stream can be sampled by the assigned sampling process 336 to produce an output video stream, or vice versa: the sampled video frames can subsequently be scaled according to the received scaling parameters.

In some embodiments, the client device can create embedded audio for the output video stream from input audio streams received from the virtual conference provider. The client device can mix the input audio streams to create embedded audio (or an "output audio stream") that can be provided to client devices with the output video stream. Mixing the audio streams can mean selecting one or more of the input audio streams and combining the selected audio streams to produce the output audio stream. The volume for the input audio streams can be balanced by increasing or decreasing the audio level of the individual audio streams that are included in the output audio stream. A user can specify an appropriate audio format for the output audio stream and the client device can transform the input audio streams to produce an output audio feed in the specified audio format.

Audio streams can be combined and provided to the conference participants as a consolidated audio stream. In the imperfect workarounds described above, each isolated audio stream is part of a separate virtual conference session that is associated with a dedicated computer. The virtual conference participants can generate the isolated audio streams at their client devices and the isolated streams are sent to the separate virtual conference sessions. These isolated audio streams are forwarded from the separate virtual conference sessions and captured at the dedicated computers. The captured audio streams are mixed together using audio editing software or hardware to create the consolidated audio stream (e.g., output audio stream). These consolidated audio stream can be used to create submixes for each meeting participant by removing the participant's audio stream from the consolidated audio stream (e.g., so that the submix contains audio streams for the other participants without the participant's own audio stream), and these submixes can be forwarded to the conference participants' client devices via the dedicated computers/separate virtual conference sessions. Because of the number of components in the imperfect workaround, this architecture is inefficient and can cause significant audio latency for conference participants.

The audio latency for meeting participants can be improved by an architecture that mixes audio at a consolidated virtual conference session. Instead of each conference participants' audio stream being sent to a separate virtual conference session, the audio streams can be sent to a single virtual conference session (e.g., the consolidated virtual conference session). The audio streams that are received at the consolidated virtual conference session can be mixed together by the computing device hosting the session to create the consolidated audio stream. The computing device hosting the consolidated virtual conference session can create submixes from the consolidated audio stream and return the submixes to their respective virtual conference participants. This improved architecture can reduce the audio latency (e.g., caller to caller latency) from 450 milliseconds (ms) to 200 ms, when compared to the imperfect workarounds, because the architecture contains fewer components.

The output video stream can be returned to the client device that requested the video stream. The client device can provide the output video stream, in the appropriate output format, to output devices 350*a-n* (or "video editing systems") for inclusion in a recording or broadcast. Output devices 350*a-n* can be software or hardware for editing, transforming, or otherwise manipulating media streams. The output devices 3350*a-n* can treat the output video stream as though it is a standard input video stream from a camera because the output video stream was sampled and scaled according to the specified output format. Accordingly, the output video stream is compatible with the drivers controlling the video editing systems and the output video stream can be manipulated or edited by the output devices 350*a-n*. Output video streams from the client device 330 can be transmitted to the virtual conference provider 310 via network 320 or the video streams can be output by physical outputs on the client device 330. The output video streams may be provided directly to the requesting client device via a local network. The transmitted output video streams can be included in a virtual conference hosted by virtual conference provider 310, and the transmitted output video feeds can be provided to a client device such as client device(s) 330, 340*a-n*.

Figure 4:
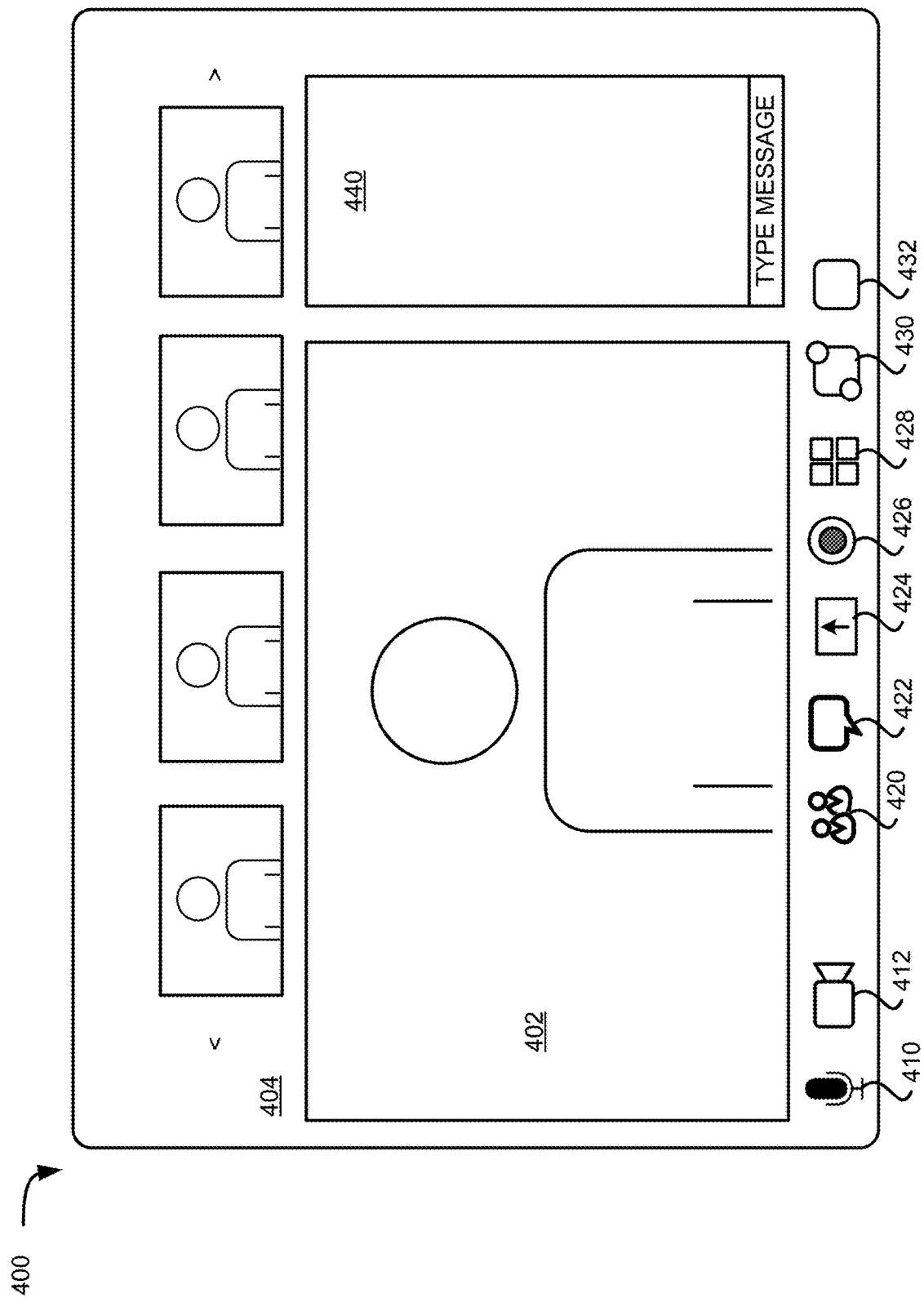

Referring now to FIG. 4, FIG. 4 illustrates an example graphical user interface ("GUI") 400 for a software client that can configure settings for virtual conference participants. A client device, e.g., client device 330 or client devices 340*a-n*, executes a client software as discussed above, which in turn displays the GUI 400 on the client device's display. In this example, the GUI 400 includes a speaker view window 402 that presents the current speaker in the video conference. Above the speaker view window 402 are smaller participant windows 404, which allow the participant to view some of the other participants in the video conference, as well as controls ("<" and ">") to let the host scroll to view other participants in the video conference. On the right side of the GUI 400 is a chat window 440 within which the participants may exchange chat messages.

Beneath the speaker view window 402 are a number of interactive elements 410-530 to allow the participant to interact with the video conference software. Controls 410-512 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant to toggle recording of the meeting. Selecting control 426 can be used to provide a request for an output video stream and the graphical user interface 400, after control 426 is selected, can prompt the participant to select individual feeds for isolation. The graphical user interface can allow the participant to request output video feeds for a subset of participants in a video conference or for every participant in a video conference including feeds for 100 or more participants. A participant can select a destination for the video feeds using graphical user interface 400 and each output video feed can be assigned a different destination and multiple destinations can be assigned for each output video feed. Control 428 allows the user to select an option to join a breakout room. Control 430 allows a user to launch an app within the video conferencing software, such as to access content to share with other participants in the video conference. Control 432 can be selected to open a graphical user interfaces 500-700 that can be used to configure settings for the output streams.

While the graphical user interfaces 500-700 can be part of the virtual conference provider's software client 400, the configuration platform shown in graphical user interfaces 500-700 may be entirely separate from the software client 400.

Figure 5:
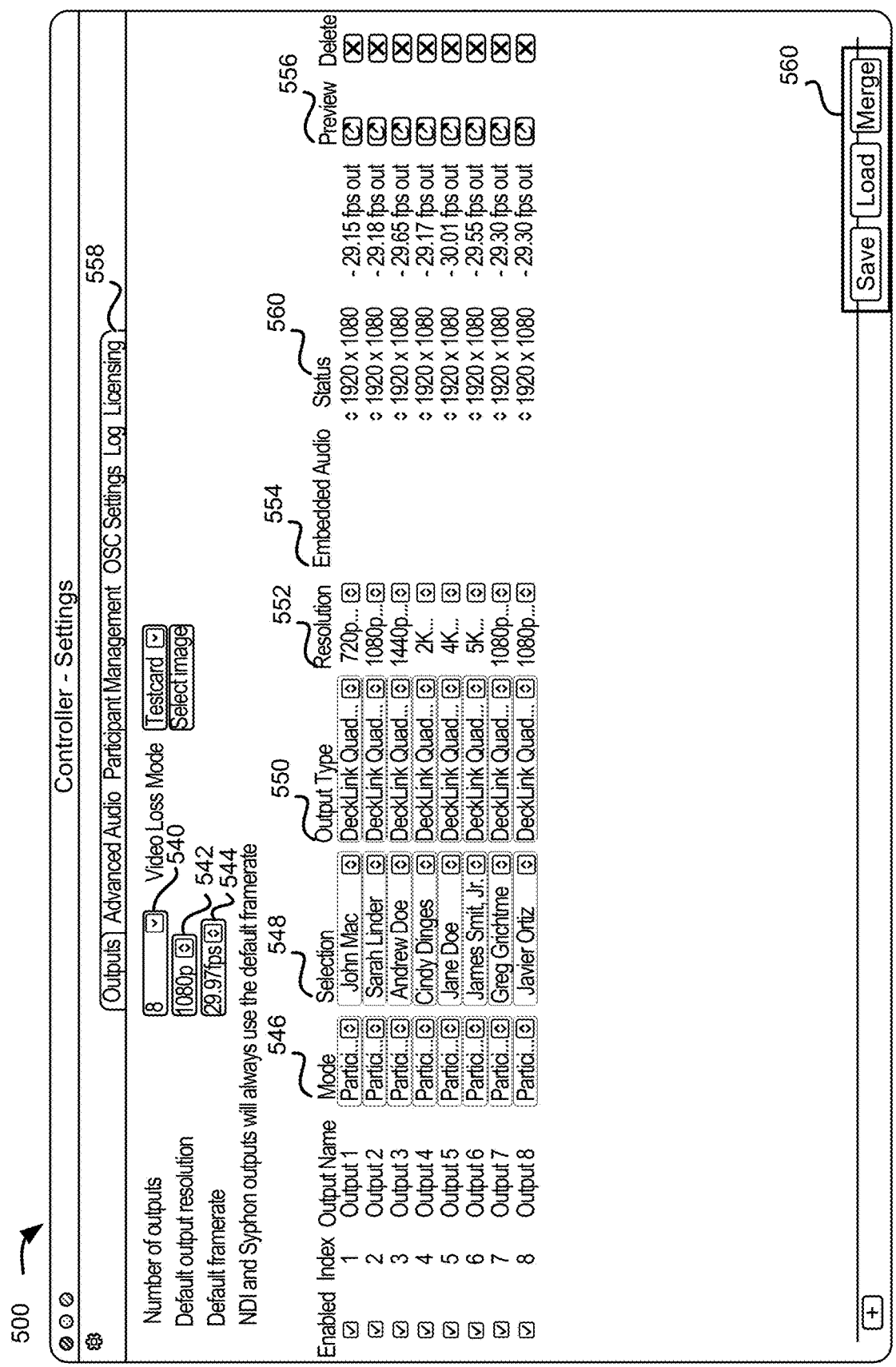

Referring now to FIG. 5, FIG. 5 illustrates an example graphical user interface ("GUI") 500 for a software client that can configure settings for the output streams. Control 540 can be used to select the number of output streams. The output streams can be initialized with a default output resolution and a default framerate. Control 542 can be used to select a default output resolution and control 544 can be used to select a default framerate. Control 546 can be used to select participants by various properties including allowing the selection of a participant by their gallery index, user identifier (ID), name, custom tracking identifier, etc. These properties, or modes, for each input or output channel can be set using control 546. The modes include participant, mix, and output. Modes allow users to define "who or what" should appear on an output, and specifically, the choice of Mode allows a user to configure how to select what is shown in a feed. For example, a mode of "Participant" allows a user to select a virtual conference attendee by the attendee's unique identifier (e.g., username). Other properties can be used to identify participants, and, for instance, "Gallery Position" can be used as the mode instead. Gallery Position is the location in the graphical user interface 400 where a participant's video feed is displayed, and, for instance, the positions in a conference with 50 participants can be numbered from 1 to 50. A participant can be selected by choosing a number X from 1 to 50, and the participant in position X will be routed to the output. Modes can be defined for roles, such as which participant has the Spotlight property (e.g., using Mode of Spotlight) or maybe by who is the current person talking (e.g., using Mode of Active Speaker).

A participant or client device can be assigned as a specific output stream using control 548. Control 550 can be used to select an output format (or "output type") for the output streams. Output resolutions for individual output streams can be configured and changed from the default output resolution using control 552. Output resolutions can include 720p, 1080p, 1440p, 2K, 4K, and 5K. Embedded audio for the output streams (e.g., output audio streams produced using input audio streams from the client devices or cameras generating the individual streams) can be enabled using control 554. In addition, control 556 can be selected to show a preview of the output stream. Status 560 shows characteristics for each output stream and the status can show the actual output resolution and framerate for the output video streams. Controls 558 can be used to select graphical user interface 500, 600, or 700 to configure settings for output streams. In addition, controls 560 can be used to save, load, or merge configurations so that users can define different modes of operation. These configurations can be used for different archetypes of events (e.g., fully virtual, hybrid, etc.), in which case, control 560 can be used to export a configuration to a saved file that can be loaded in at runtime. These configurations can allow users to switch between preset operating configurations quickly without manually applying all settings individually. Merging configurations can refer to the ability to append a saved configurations to the current configuration. For example, the current configuration with 3 defined outputs and a saved configuration with 4 output definitions can be merged to create a combined configuration with 7 outputs. In contrast, loading a configuration can replace the current configuration with a saved configuration (e.g., replacing the 3 output configuration with the 4 output configuration in the previous example).

Figure 6:
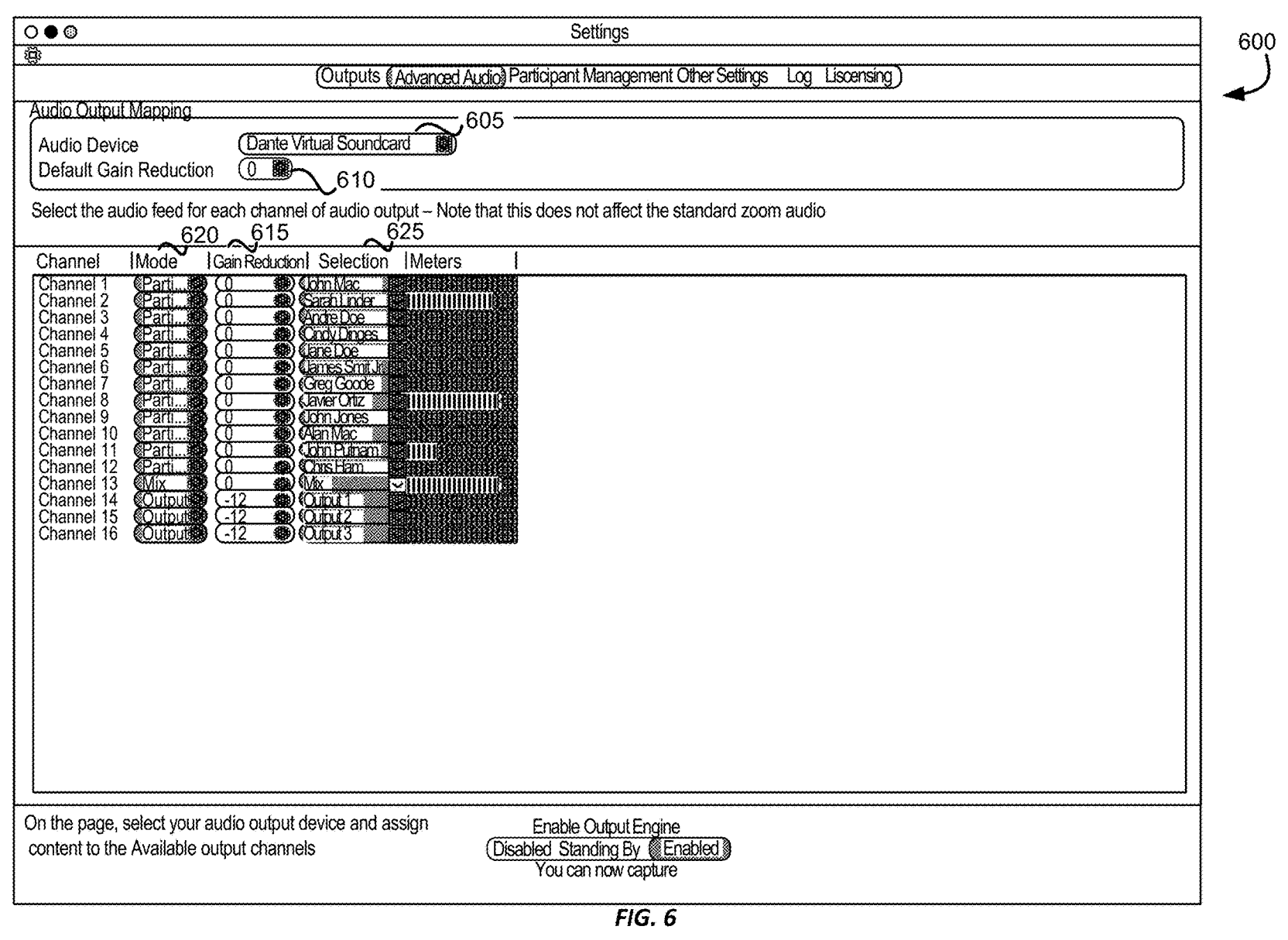

FIG. 6 illustrates an example graphical user interface ("GUI") 600 for a software client that can configure settings for the output streams. GUI 600 can be used to select audio settings for the output streams. Control 605 can be used to select one or more output protocols for the audio output streams. A default gain reduction amount can be set for all output streams using control 610 and individual gain reduction amounts can be set for each input stream using control 615.

The mode for each input or output channel can be set using control 620. The modes include participant, mix, and output. Modes allow users to define "who or what" should appear on an output, and specifically, the choice of Mode allows a user to configure how to select what is shown in a feed. For example, a mode of "Participant" allows a user to select an audio stream for a virtual conference attendee by the attendee's unique identifier (e.g., username). Other properties can be used to identify participants, and, for instance, "Mix" can be used as the mode instead. Mix can provide a total sum of the audio in the virtual conference session. In addition, "Output" can allow a user to select the audio for an isolated audio stream. As an example, if Paul was on video output 3, a user could get Paul's audio by setting my audio channel mode to Output and then selecting Output 3. Later, if the user moves Sarah to video output 3, the user does not have to go update the audio channels because the audio is already set to output 3. Control 625 can be used to select a source for input audio feeds and a destination for output audio feeds. The sources for each input audio feed can be selected by choosing the name of a conference participant that corresponds to the feed.

Figure 7:
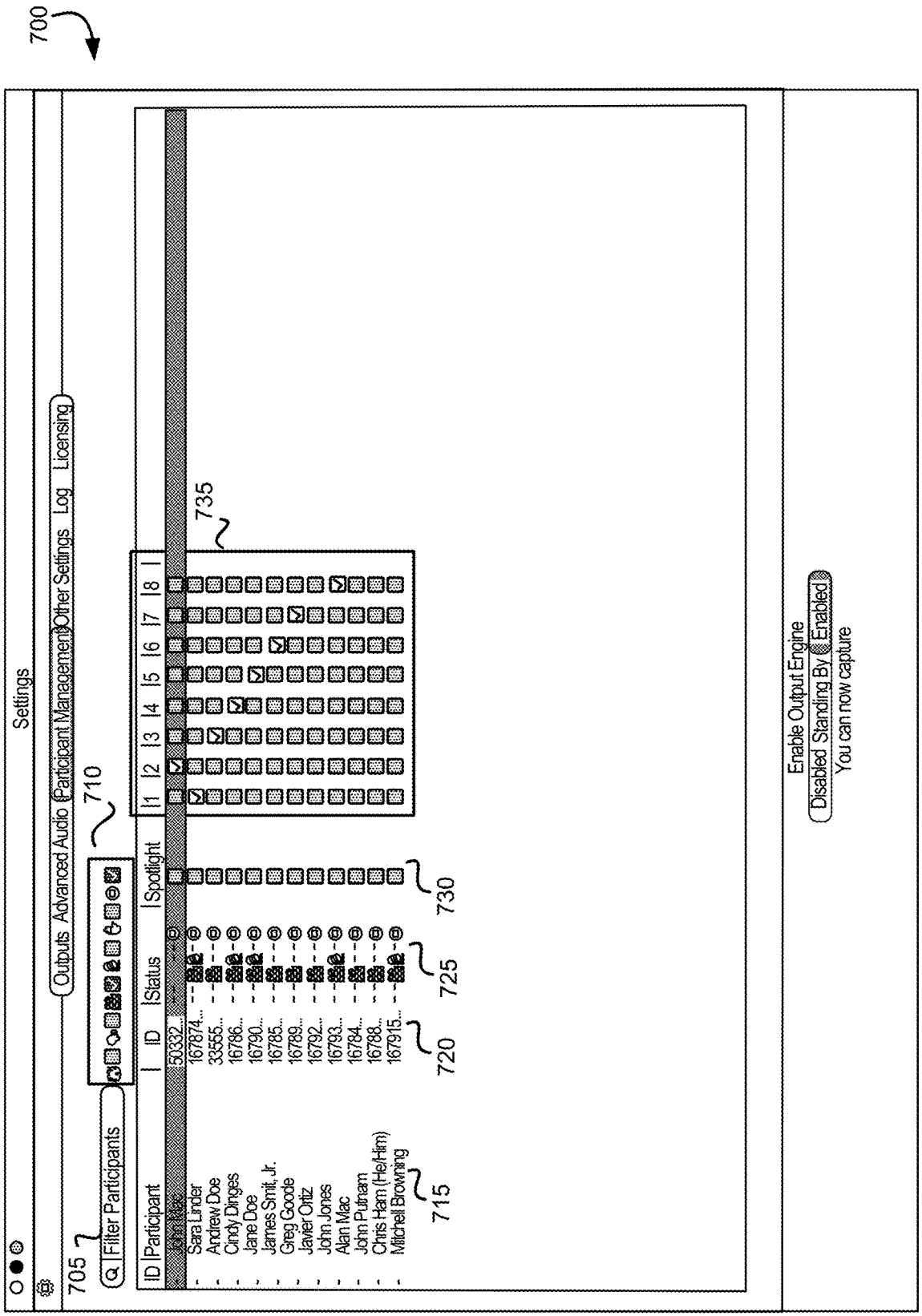

FIG. 7 illustrates an example graphical user interface ("GUI") 700 for a software client that can be used to manage participants in a virtual conference. GUI 700 can be used to search for conference participants using alphanumeric inputs such as a name, an account name, or a unique identifier (ID). In addition, the conference participants displayed in graphical user interface 700 can be filtered using control 710 which includes a check box representing participants that are featured (or "in the spotlight"), a check box for active speakers, a checkbox for participants with a video feed, a check box for participants with an audio feed, a check box for participants that have virtually raised their hand, and a check box for participants that have connected to the conference. Selecting one or more check box in control 710 can cause the graphical user interface 700 to display conference participants with the selected characteristics. For example, the configuration shown in FIG. 7 will display conference participants that are connected to the conference with a video feed. Column 715 displays the filtered list of participants by name, column 720 displays a unique identifier for each participant, and column 725 contains icons representing characteristics for each filtered participant. Control 730 can be used to put participants into the spotlight (or "feature" the participants) by selecting the check box in that participant's row. Control 735 can be used to map one or more participants to an output video channel (e.g., outputs 1-8). The outputs 1-8 can be output channels for the output streams that correspond to different output addresses for the streams. Multiple participants can be assigned to the same output video channel and a participant can be assigned to multiple output video channels.

Figure 8:
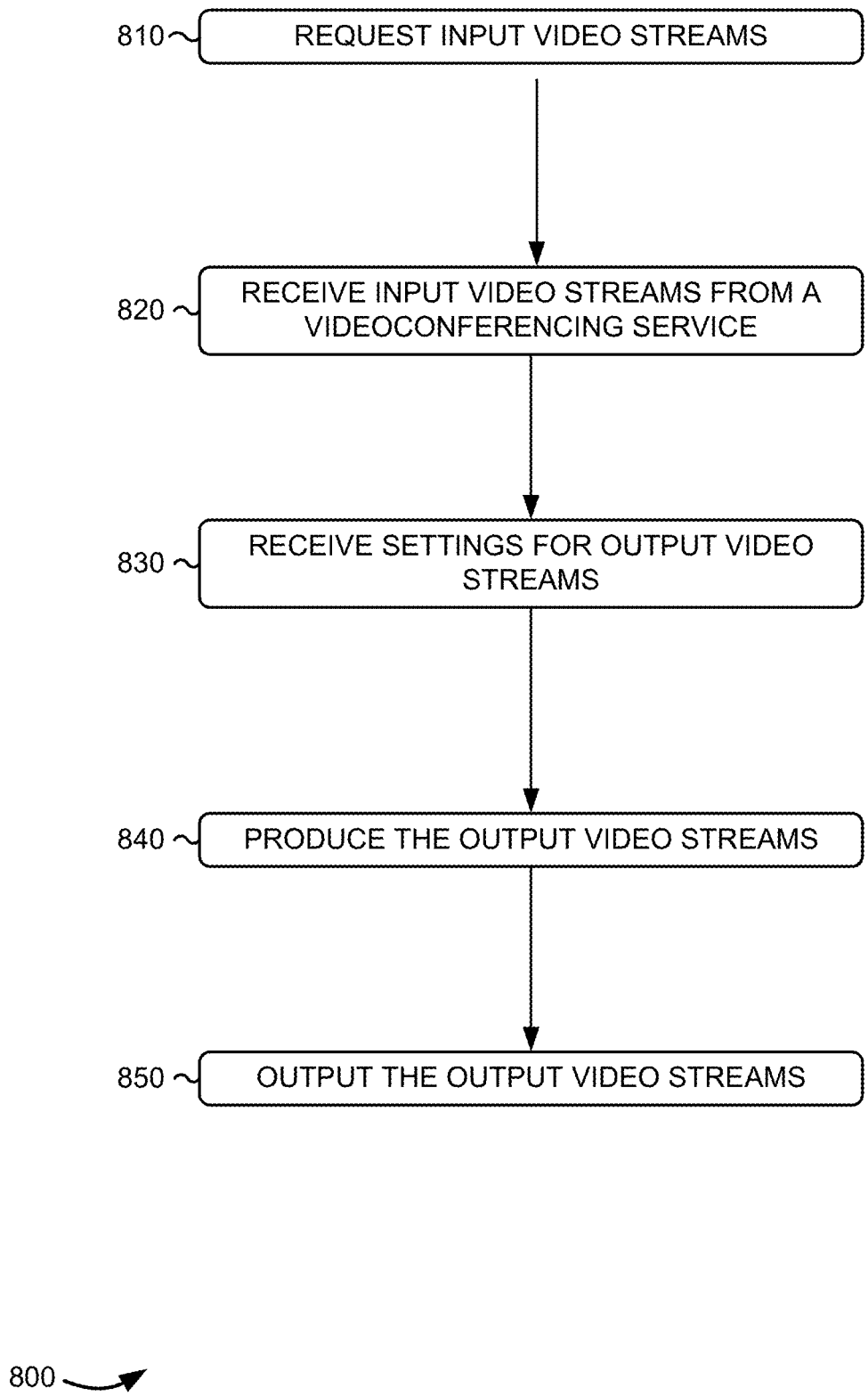
FIG. 8 shows an example method for implementing techniques for isolating videoconference streams according to various embodiments.

Referring now to FIG. 8, FIG. 8 shows an example method 800 for implementing techniques for isolating videoconference streams according to various embodiments. This example method 800 will be described with respect to the systems 100-400 shown in FIGS. 1-3, the example GUIs 400-700 shown in FIGS. 4-7; and the example computer device 900 shown in FIG. 9; however, any suitable systems or GUIs according to this disclosure may be employed.

At block 810, the computing device can request one or more input video streams from a video conference provider (e.g., a virtual conference provider). The request can specify particular video streams from a conference hosted by the provider, and the request can include a specified resolution, aspect ratio, color balance, contrast, or brightness. The computing device can request that the virtual conference provider transmit high-quality video streams if different quality video streams are available. The request can be sent to the video conference provider a client device such as client device(s) 140-180, 220-250, 330, 340a-n.

At block 820, input video streams can be received from a videoconferencing service. The input video streams can be one or more input video streams specified at 810. In some embodiments, the input video streams can comprise video streams from a video conference, and the input video streams can correspond to one or more participants from a videoconference hosted by video conference provider 210, 310. The input video streams can be received at a videoconferencing service from one or more client device such as client device(s) 140-180, 220-250, 330, 340a-n.

At block 830, settings for the output video steams can be received. The settings can indicate one or more video stream properties for the output video streams and the settings can be used by one or more scaling process(es) 334, or sampling process(es) 336 to prepare the output video streams (e.g., output streams). The settings for the output video streams can be received at the client device 330 running the one or more scaling process(es) or sampling process(es) from a client device such as client device(s) 140-180, 220-250, 340a-n. The settings may be received at the controller through a network connection with the client devices (e.g., network 120, 320), or the settings may be received at the client device 330 and from the other client devices via the virtual conference provider 210, 310. In various embodiments, the settings can be provided to the controller or a client device using a graphical user interface such as graphical user interface 500, or graphical user interface 501. The settings can include specified video stream properties including one or more of a specified video resolution, a specified frame rate, or a specified output format.

At block 840, the output video streams can be produced from one or more of the input video streams. The output video streams can be produced according to the one or video feed properties specified at 820. The output video streams can be produced by a client device such as client device(s) 140-180, 220-250, 330, 340a-n. To produce the video, a scaling process such as scaling process 334 may scale an input video stream based on the specified video stream properties such as video resolution, aspect ratio, or encoding format as discussed above with respect to 820, and a sampling process such as sampling process 336 may sample one or more of the first video stream according to the specified video stream properties such as the frame rate received at block 820. Sampling and scaling by the sampling process or scaling process can be performed using calls to an application programming interface (API) operating on the client device 330. A sampling process such as sampling process(es) 336 may sample the first video stream in accordance with an output format specified in 820. The output video streams can be produced from some or all of the input video streams, and producing the output video streams may comprise changing one or more of the input video streams from a first output format to a second output format. The input video streams and the output video streams may include audio streams in some embodiments.

At block 850, one or more video streams of the output video streams can be output. The client device 330 can output the video streams to one or more output device(s) such as output devices 350*a-n*. The client device 330 can output the video steams to the virtual conference provider such as virtual conference provider(s) 210, 310 and the virtual conference provider can output or save the scaled and sampled video stream in the output format specified at block 820. The virtual conference provider can output the video streams to one or more client device(s) such as client device(s) 140-180, 220-250, 330, 340*a-n*. In some embodiments, the output video streams can comprise an output media stream with a video stream and an audio stream, or the output video stream can comprise an output audio stream. The output video streams may be output to video editing software operating on a client device or video editing software hosted on the virtual conference provider.

Figure 9:
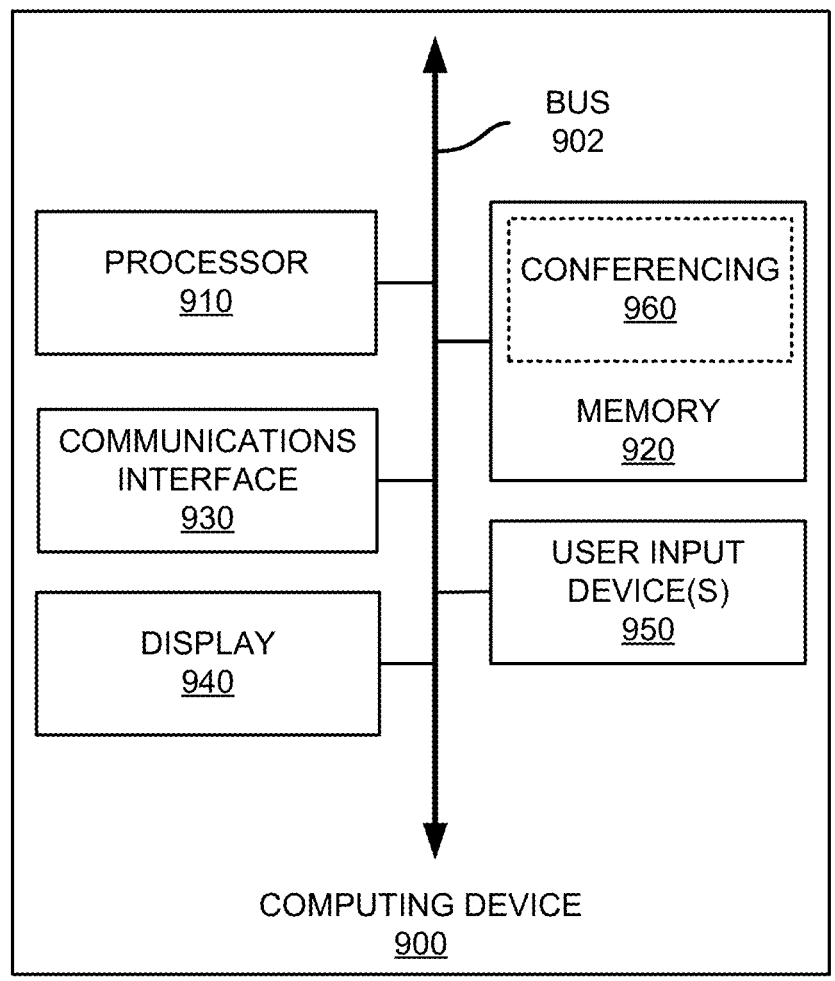
FIG. 9 shows an example computing device suitable for use with example techniques for isolating videoconference streams according to various embodiments.

Referring now to FIG. 9, FIG. 9 shows an example computing device 900 suitable for use in example systems or methods for systems for implementing techniques for isolating videoconference streams according to various embodiments. The example computing device 900 includes a processor 910 which is in communication with the memory 920 and other components of the computing device 900 using one or more communications buses 902. The processor 910 is configured to execute processor-executable instructions stored in the memory 920 to perform one or more methods for implementing a videoconference audio-visual controller according to different examples, such as part or all of the example method 800 described above with respect to FIGS. 9. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a video conferencing application 960 to enable a user to join and participate in one or more virtual spaces or in one or more conferences, such as a conventional conference or webinar, by receiving media streams from a video conference provider, sending media streams to the video conference provider, joining and leaving breakout rooms, creating video conference expos, etc., such as described throughout this disclosure, etc.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
    requesting, by a computing device, a set of input video streams from a videoconferencing service, the input video streams corresponding to one or more videoconference participants;
    receiving, by the computing device, one or more input video streams from the videoconferencing service;
    receiving, by the computing device, settings for one or more output video streams of a set of output video streams, the settings indicating one or more output video stream properties and one or more output channels for each of the one or more output video streams, wherein each output channel of the one or more output channels is associated with a destination;
    producing, by the computing device, the set of output video streams from the set of input video streams according to the one or more output video stream properties; and
    outputting, by the computing device, one or more output video streams of the set of output video streams to the destination associated with each of the one or more output channels.

2. The method of claim 1, wherein the producing further comprises:
    scaling, by the computing device, the set of input video streams according to the output video stream properties; and
    sampling, by the computing device, the set of scaled input streams to produce the set of output video streams.

3. The method of claim 2, wherein the scaling and sampling are performed by application programming interface (API) calls to one or more processors of the computing device.

4. The method of claim 1, wherein outputting the one or more video streams comprises outputting, by the computing device, the one or more output video streams to video editing software.

5. The method of claim 1, wherein the one or more output video stream properties comprise an aspect ratio, a resolution, a frame rate, or an output format.

6. The method of claim 1, wherein outputting the one or more video streams comprises transmitting one or more output video streams of the set of output video streams to an output device.

7. The method of claim 6, wherein outputting the one or more output video streams comprises transmitting one or more output video streams of the set of output video streams according to an output format.

8. A device comprising:
    one or more processors configured to:
    request a set of input video streams from a videoconferencing service, the input video streams corresponding to one or more videoconference participants;
    receive one or more input video streams from the videoconferencing service;
    receive settings for one or more output video streams of a set of output video streams, the settings indicating one or more output video stream properties and one or more output channels for each of the one or more output video streams, wherein each output channel of the one or more output channels is associated with a destination;
    produce the set of output video streams from the set of input video streams according to the one or more output video stream properties; and
    output one or more output video streams of the set of output video streams to the destination associated with each of the one or more output channels.

9. The device of claim 8, wherein the processors are configured to produce the set of output video streams by:
    scaling the set of input video streams according to the one or more output video stream properties; and
    sampling the set of scaled input streams to produce the set of output video streams.

10. The device of claim 9, wherein the scaling and sampling are performed by application programming interface (API) calls to the one or more processors.

11. The device of claim 8, wherein outputting the one or more video streams comprises outputting the one or more output video streams to video editing software.

12. The device of claim 8, wherein the one or more output video stream properties comprise an aspect ratio, a resolution, a frame rate, or an output format.

13. The device of claim 8, wherein outputting the one or more video streams comprises transmitting one or more output video streams of the set of output video streams to an output device.

14. The device of claim 13, wherein outputting the one or more output video streams comprises transmitting one or more output video streams of the set of output video streams according to an output format.

15. A non-transitory computer-readable medium storing a set of instructions, the set of instructions comprising:
    one or more instructions that, when executed by one or more processors of a device, cause the device to:
    request a set of input video streams from a videoconferencing service, the input video streams corresponding to one or more videoconference participants;
    receive one or more input video streams from the videoconferencing service;
    receive settings for one or more output video streams of a set of output video streams, the settings indicating one or more output video stream properties and one or more output channels for each of the one or more output video streams, wherein each output channel of the one or more output channels is associated with a destination;
    produce the set of output video streams from the set of input video streams according to the one or more output video stream properties; and
    output one or more output video streams of the set of output video streams to the destination associated with each of the one or more output channels.

16. The medium of claim 15, wherein the instructions further comprise:
    scaling the set of input video streams according to the one or more output video stream properties; and
    sampling the set of scaled input streams to produce the set of output video streams.

17. The medium of claim 16, wherein the scaling and sampling are performed by application programming interface (API) calls to the one or more processors.

18. The medium of claim 15, wherein outputting the one or more video streams comprises outputting the one or more output video streams to video editing software.

19. The medium of claim 15, wherein the one or more output video stream properties comprise an aspect ratio, a resolution, a frame rate, or an output format.

20. The medium of claim 15, wherein outputting the one or more video streams comprises transmitting one or more output video streams of the set of output video streams to an output device.

* * * * *